(12) United States Patent
Nice et al.

(10) Patent No.: US 10,284,679 B2
(45) Date of Patent: May 7, 2019

(54) MAINTAINING PRIVACY DURING PERSONALIZED CONTENT DELIVERY

(75) Inventors: Nir Nice, Kfar Veradim (IL); Ehud Wieder, Sunnyvale, CA (US); Arie Friedman, Petach-Tikva (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1168 days.

(21) Appl. No.: 12/683,618

(22) Filed: Jan. 7, 2010

(65) Prior Publication Data

US 2011/0167003 A1 Jul. 7, 2011

(51) Int. Cl.

| | | |
|---|---|---|
| *G06F 9/44* | (2018.01) | |
| *H04L 29/08* | (2006.01) | |
| *G06Q 30/02* | (2012.01) | |
| *H04L 29/06* | (2006.01) | |
| *H04N 21/81* | (2011.01) | |

(Continued)

(52) U.S. Cl.
CPC ....... *H04L 67/306* (2013.01); *G06Q 30/0271* (2013.01); *H04L 9/083* (2013.01); *H04L 9/321* (2013.01); *H04L 63/0407* (2013.01); *H04L 63/0428* (2013.01); *H04L 67/20* (2013.01); *H04N 21/812* (2013.01)

(58) Field of Classification Search
None
See application file for complete search history.

(56) References Cited

U.S. PATENT DOCUMENTS

| 6,148,337 A | 11/2000 | Estberg |
| 6,957,334 B1 | 10/2005 | Goldstein |

(Continued)

FOREIGN PATENT DOCUMENTS

CN 1394408 A1 1/2003

OTHER PUBLICATIONS

Boneh, Dan, et al., Public-Key Encryption with Oblivious Keyword Search. Priced Oblivious Transfer—Published Date: 2007-2008, http://www.cosic.esat.kuleuven.be/publications/thesis-147.pdf.

(Continued)

*Primary Examiner* — Namrata Boveja
*Assistant Examiner* — Murali K Dega
(74) *Attorney, Agent, or Firm* — Shook, Hardy & Bacon LLP

(57) ABSTRACT

Embodiments of the present invention relate to systems, methods, and computer-storage media for maintaining privacy while delivering advertisements based on encrypted user profile identifiers. In embodiments, a Public key Encryption with Keyword Search (PEKS) is used to generate a public key and a private key. In embodiments, a public key and a private key are used to encrypt user profile identifiers and generate trapdoors associated with defined profile identifiers, respectively. A portion of the encrypted user profile identifiers are compared to a portion of the trapdoors. If a match is present between at least one encrypted user profile identifier and an associated trapdoor, a delivery engine is provided with an identification of content to be delivered to the user. The provided description is then used to determine an advertisement to present to a user. The advertisement is then presented to the user.

20 Claims, 10 Drawing Sheets

(51) Int. Cl.
*H04L 9/08* (2006.01)
*H04L 9/32* (2006.01)

(56) References Cited

U.S. PATENT DOCUMENTS

| | | | |
|---|---|---|---|
| 7,725,404 B2* | 5/2010 | Sellars | G06F 21/10 380/1 |
| 8,001,370 B2* | 8/2011 | Kamijo | H04L 63/0442 380/255 |
| 2002/0099663 A1 | 7/2002 | Yoshino et al. | |
| 2005/0010536 A1* | 1/2005 | Cochran | G06F 21/10 705/76 |
| 2006/0101288 A1* | 5/2006 | Smeets | G06F 21/602 713/194 |
| 2007/0005594 A1 | 1/2007 | Pinkas | |
| 2007/0016476 A1* | 1/2007 | Hoffberg | G05B 15/02 705/14.64 |
| 2007/0180249 A1* | 8/2007 | Hatakeyama | G06F 21/10 713/176 |
| 2008/0028330 A1 | 1/2008 | Chang et al. | |
| 2008/0148067 A1* | 6/2008 | Sitrick | H04L 9/0861 713/193 |

OTHER PUBLICATIONS

Patient Controlled Encryption: Ensuring Privacy of Electronic Medical Records—Published Date: Nov. 13, 2009 http://209.85.229.132/search?g=cache:tzLrmcALSXsJ:research.microsoft.com/en-us/um/people/horvitz/ccsw_2009_benaloh_chase_horvitz_lauter.pdf+Patient+Control led+Encryption:+Ensuring+Privacy+of+Electronic+Medical+Records&cd=1&hl=en&ct=cInk.

Shikfa, Abdullatif, et al., Privacy in Context-Based and Epidemic Forwarding—Published Date: 2009 http://www.eurecom.fr/util/publidownload.en.htm?id=2847.

Tang, Qiang, Revisit the Concept of PEKS: Problems and a Possible Solution—Published Date: Aug. 28, 2008 http://doc.utwente.nl/64938/1/Revisit_the_Concept_of PEKS_-_Problems_and_a_Possible_Solution.pdf.

Boneh, Dan, et al., Public Key Encryption that Allows PIR Queries—Published Date: Feb. 23, 2006 http://www.cs.umd.edu/~gasarch/pir/publickey.pdf.

Khader, Dalia, Public Key Encryption with Keyword Search based on K-Resilient IBE—Published Date: Aug. 29, 2007, http://eprint.iacr.org/2006/358.pdf.

Chinese Office Action dated Aug. 4, 2014 in Application No. 201110008381.4, 9 pages.

"Second Office Action Issued in Chinese Patent Application No. 201110008381.4", dated Mar. 31, 2015, 3 Pages.

* cited by examiner

MAINTAINING PRIVACY DURING PERSONALIZED CONTENT DELIVERY

Embodiments of the present invention relate to systems, methods, and computer-storage media for maintaining privacy while delivering content, such as advertisements, based on encrypted user profile identifiers. In embodiments, a Public key Encryption with Keyword Search (PEKS) is used to generate a public key and a private key. In embodiments, the public key and the private key are used to encrypt user profile identifiers and generate trapdoors based on defined profile identifiers, respectively. A portion of the encrypted user profile identifiers are compared to a portion of the trapdoors. If a match is present between at least one encrypted user profile identifier and an associated trapdoor, a delivery engine is provided with an identification of content to be delivered to the user. The provided description is then used to determine an advertisement to present to a user. The advertisement is then presented to the user.

This Summary is provided to introduce a selection of concepts that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures.

DETAILED DESCRIPTION

Figure 1:
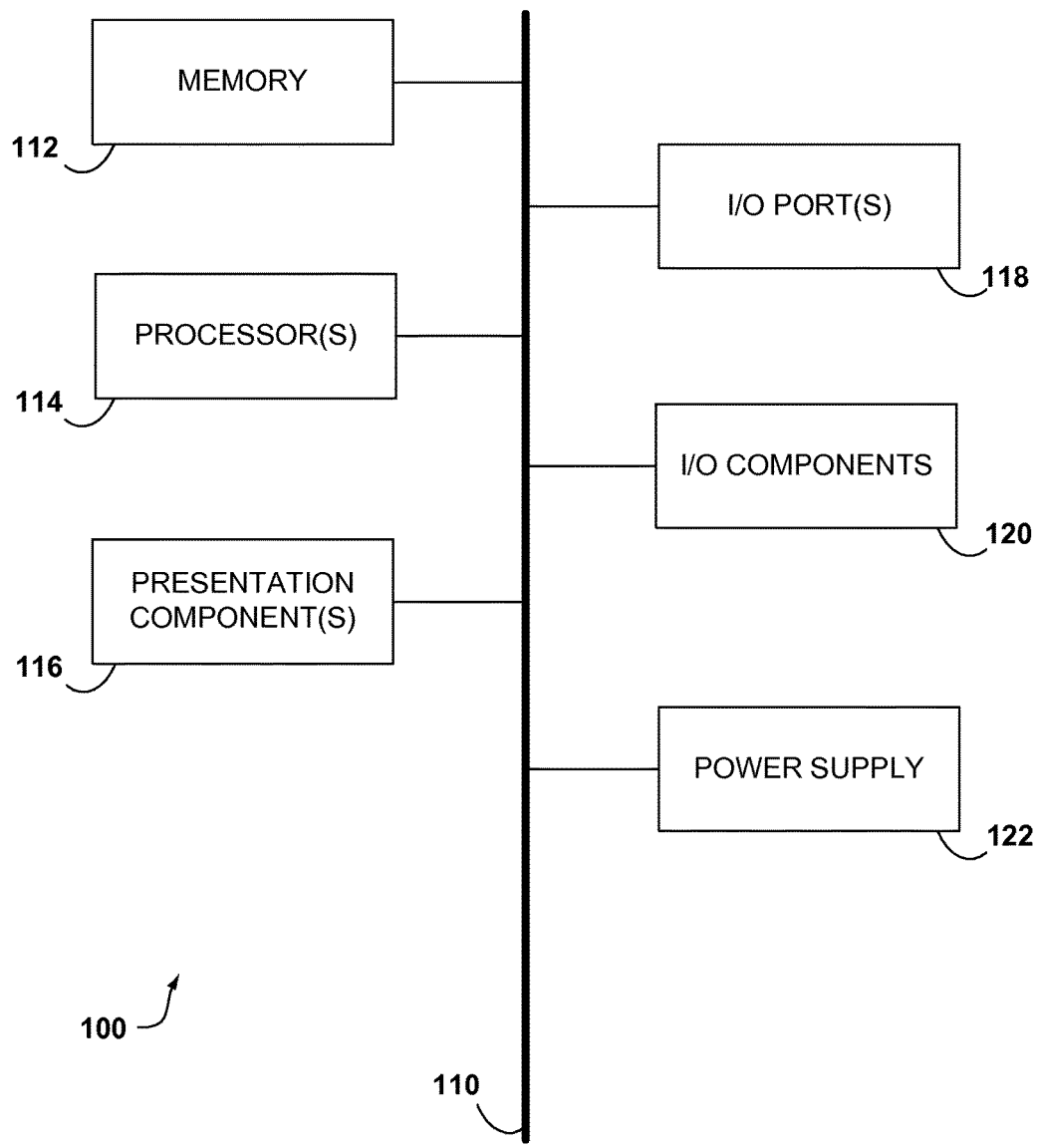
FIG. 1 illustrates an exemplary computing device suitable for use in connection with embodiments of the present invention.

The subject matter of embodiments of the present invention is described with specificity herein to meet statutory requirements. Although the terms "step," "block," and/or "module," etc. might be used herein to connote different components of methods or systems employed, the terms should not be interpreted as implying any particular order among or between various steps herein disclosed unless and except when the order of individual steps is explicitly described.

Users are increasingly interested in protecting their privacy when using electronic communications. In delivering electronic content to a user, there is a balance between protecting a user's privacy and providing the user with personalized content. In order to provide personalized content to a user, a delivery engine may use information from the user to determine which content should be delivered to the user. Embodiments of the present invention provide methods for minimizing the exposure of user information to a delivery engine while preserving the ability of the delivery engine to provide personalized content to the user.

Embodiments of the present invention are generally directed to computer systems, computer-implemented methods, and computer-storage media for maintaining privacy of a user while providing the user personalized content, such as advertisements. Personalized content may be delivered to a user through a method of receiving user information, determining content to provide to the user based on the user information, and presenting the content to the user. Further, privacy of a user may be maintained during the delivery of personalized content to the user by encrypting the user information used to determine the personalized content. A bilinear PEKS system may be used to match identifiers associated with encrypted user information with associated trapdoors. A trapdoor enables a matching service to test for the presence of encrypted user information associated with one or more trapdoors. Further, an identification of content associated with the matched identifiers may be provided to a delivery engine, where the identification of content is used to determine content to be presented to the user. As such, the privacy of identifiers failing to meet the best match criteria is preserved. In embodiments, the delivery engine is not exposed to the user information. Rather, the identification of content is based on the encrypted user information, but the privacy of all user information is preserved even when a match is determined.

In embodiments, user information is used to determine personalized content, such as advertisements, to be presented to the user. User information may comprise user profile identifiers that are generated by a profiling service and are specific to the user. In some embodiments, a user profile may comprise profile identifiers based on user characteristics, user preferences, user activities, and/or inputs by a user. For example, a user profile may comprise a listing of the user's favorite sports: basketball, soccer, and baseball. The terms "basketball," "soccer," and "baseball" may be considered profile identifiers, as may a phrase "likes sports." Profile identifiers may also comprise a wide variety of topics, such as sports, cars, demographic information, statistics, news, preferences, etc. As used herein, a user refers to one or more users that may provide user information to a delivery engine. For example, users may refer to members of a family that interact with a computing device associated with the users. As such, advertisements provided to a computing device may be based on user profile identifiers associated with users associated with the computing device.

To secure the privacy of user information, user profile identifiers may be encrypted using a PEKS system. Although depicted as each being executed by separate devices, the user component, trusted party component ("trusted party"), and delivery engine component ("delivery engine") discussed herein can be executed by a single device or by multiple devices. Defined profile identifiers are generic to all users and may cover any variety of topics including, but not limited to, sports, travel, income, demographic information, etc., whereas user profile identifiers are specific to a particular user. In particular, user profile identifiers are encrypted by a user component at a computing device associated with the user. In embodiments, the computing device associated with the user is a first computing device designated "U." Additionally, one or more trapdoors that are based on defined profile identifiers may be generated by a trusted party at a second computing device designated "T." The trusted party may provide trapdoors associated with all of the defined profile identifiers or a trapdoors associated with a subset of the defined profile identifiers to the delivery engine. For example, if a delivery engine only possesses advertisements related to cars, a trusted party may only provide the delivery engine with trapdoors based on one or more defined profile identifiers that are related to cars.

A PEKS system may be used to generate a two-component encryption system: a public key designated "$K_{PUB}$" and a private key component designated "$K_{PRIV}$." In embodiments, $K_{PUB}$ is communicated by the trusted party to the user component, where user profile identifiers are encrypted using $K_{PUB}$. In additional embodiments, the trusted party uses $K_{PRIV}$ to generate trapdoors based on defined profile identifiers. The trapdoors are then communicated to a delivery engine. In further embodiments, the trusted party uses $K_{PRIV}$ to encrypt defined profile identifiers that are then communicated to a delivery engine.

Accordingly, at the user component, user profile identifiers (UPID) associated with a first user may be encrypted using a public key ($K_{PUB}$) that is known to the user. Encrypted user profile identifiers may be referred to as "$X_{UPID}$." In embodiments, user profile identifiers (UPID) are encrypted ($X_{UPID}$) using the public key ($K_{PUB}$) and a random number (referred to as "r") through the function:

$$X_{UPID}=Enc(K_{PUB}, UPID, r)$$

As such, a user may randomize the encryption of user profile identifiers with random number "r" to increase security of the encryption. Further, encrypted user profile identifiers ($X_{UPID}$) may be communicated to a delivery engine.

Further, at the trusted party, trapdoors referred to as "$TW_{PID}$" based on defined profile identifiers (PID) may be generated using a private key ($K_{PRIV}$). The trapdoors ($TW_{PID}$) may then be delivered to a delivery engine. Trapdoors ($TW_{PID}$) may be used by the delivery engine to determine an identification of content to present to a user in response to receiving encrypted user profile identifiers ($X_{UPID}$). An identification of content may comprise at least one of the content itself, a link to the content, and a description of the content. In embodiments, an identification of content associated with an encrypted user profile identifier may only be provided to a delivery engine once it has been matched with an associated trapdoor. A trapdoor may be associated with a user profile identifier when the trapdoor is based on the same or similar profile identifier as the user profile identifier. Once the encrypted user profile identifier has been matched with an associated trapdoor, the associated description provided to the delivery engine may be used by the delivery engine to determine content, such as an advertisement, to deliver to a user. In embodiments, trapdoors ($TW_{PID}$) are generated based on defined profile identifiers (PID) using the private key ($K_{PRIV}$) through the function:

$$TW_{PID}=Enc(K_{PRIV}, PID)$$

In further embodiments, trapdoors ($TW_{PID}$) are generated based on defined profile identifiers using the private key in at least two iterations. Trapdoors ($TW_{PID}$)) may be generated at a delivery engine and/or one or more trusted party components. At a first iteration, a first portion of trapdoors ($TW(i)_{PID}$) may be generated at a first trusted party component based on defined profile identifiers (PID) and a first private key component designated "$K_{PRIV1}$." The first portion of the trapdoors may be generated according to the function:

$$TW(i)_{PID}=Enc(K_{PRIV1}, PID)$$

At a second iteration, a second portion of trapdoors ($TW_{PID}$) may be generated at a second trusted party component based on the first portion of the trapdoor ($TW(i)_{PID}$) and a second private key component designated as "$K_{PRIV2}$." The second portion of the trapdoors ($TW_{PID}$) may be generated according to the function:

$$TW_{PID}=Enc(K_{PRIV2}, TW(i)_{PID})$$

In further embodiments, additional and/or alternative steps may be taken to protect privacy of user profile identifiers. For instance, privacy of user profile identifiers may be further protected by inserting additional, false profile identifiers with the user profile identifiers provided by a user. As such, a delivery engine may not differentiate between genuine encrypted user profile identifiers provided by a user and false encrypted user profile identifiers that are added to further protect user privacy.

In embodiments, a PEKS bilinear function may be used to determine whether an encrypted user profile identifier matches a trapdoor. Additionally and/or alternatively, one or more delivery rules may be used to match trapdoors with encrypted user profile identifiers and present associated content, such as one or more advertisements, to a user. Delivery rules may include defined profile identifiers (PID), match scoring rules, and content rules. Match scoring rules are used to determine one or more best matches between the encrypted user profile identifiers ($X_{UPID}$) and the trapdoors ($TW_{PID}$) based on defined profile identifiers. Match scoring rules, as used herein, may refer to any category or association for determining and ranking a match between the encrypted user profile identifiers ($X_{UPID}$) and the trapdoors ($TW_{PID}$). For example, match scoring rules may be used to match encrypted user profile identifiers with associated trapdoors. If more than one encrypted user profile identifier is associated with a trapdoor, match scoring rules may be used to determine which of the matched encrypted user profile identifiers is a "best match." Additionally, content rules are used to associate content, such as advertisements, with user profile identifiers that have matched trapdoors. Content rules are used to provide to the delivery engine a identification of content associated with user profile identifiers that were matched. For example, if a first encrypted user profile identifier, enumerated as "22," is matched with a trapdoor, also enumerated "22," the delivery engine may be instructed to deliver content to a user based on the content rules associated with trapdoor 22. The content rules associated with trapdoor 22 may comprise an identification of content to be delivered to the user, such as instructions to deliver a high-end car advertisement to the user. In embodiments, the delivery engine is not exposed to the user profile identifier itself. Rather, the delivery engine is just exposed to the identification of content to be delivered to the user in response to matching a trapdoor with an encrypted user profile identifier. As such, an encrypted user profile identifier may state a preference of the user for liking high-end watches. However, the trapdoor that matches the encrypted user profile identifier related to high-end watches may be associated with content rules that include a description that an advertisement for high-end cars should be delivered to the user in response to matching the encrypted user profile identifier relating to high-end watches with an associated trapdoor. Accordingly, a set of one or more delivery rules components may be designated as follows:

Delivery Rules=<PID,MSR,CR>

In embodiments, content may be delivered to a user based on user information provided by the user to a delivery engine. User information may comprise user profile identifiers that comprise demographic information, such as age, gender, and income. For example, a first user may provide a delivery engine with a first encrypted user profile identifier that indicates the first user makes more than $100,000/year salary. At the delivery engine, the first encrypted user profile identifier may match to a first trapdoor. Once the first encrypted user profile identifier is matched with the first trapdoor, the delivery engine may reference the content rules associated with the first trapdoor to determine an identification of content to present to the user. The content rules associated with the first trapdoor may include a description of the content to provide to the user, such as "deliver an advertisement for a BMW to the user." Accordingly, the delivery engine may deliver an advertisement associated with a BMW to the first user. In alternative embodiments, the delivery engine may use other content rules to find a replacement advertisement that would closely meet the original description, such as delivering another high-end car advertisement to the user. For example, in the absence of a BMW advertisement, the delivery engine may deliver an advertisement for a Mercedes to the first user.

In another example, a second user may provide a delivery engine with a second encrypted user profile identifier that indicates the second user makes less than $50,000/year salary. At the delivery engine, the second encrypted user profile identifier may match to a second trapdoor. Once the second encrypted user profile identifier is matched with the second trapdoor, the delivery engine may reference the content rules associated with the second trapdoor to determine an identification of content to present to the user. The content rules associated with the second trapdoor may include a description of the content to provide to the user, such as "deliver an advertisement for a KIA to the user." Accordingly, the delivery engine may deliver an advertisement associated with a BMW to the second user.

In further embodiments, content delivered to a user is based on 1) user information provided by the user to a delivery engine, and 2) the availability of content at the delivery engine. For example, a user called "Mike" may send a set of encrypted user profile identifiers associated with cars, travel, mountain bikes, and cookware to a delivery engine that serves personalized advertisements to a user, such as delivery engine "DE1." However, DE1 may only have advertisements relating to cookware and computers. In order to maximize a user's privacy, a trusted party that delivers trapdoors to DE1 may only provide trapdoors associated with defined profile identifiers relating to cookware and computers. In this way, DE1 is only able to match and provide content rules associated with user information related to cookware and computers. In accordance with the example above, only Mike's encrypted user profile identifiers related to cookware may be associated with content rules when DE1 only has trapdoors related to cookware and computers. As such, Mike's other encrypted user profile identifiers relating to cars, travel, and mountain bikes may be kept private from DE1.

In alternative embodiments of the example above, Mike's encrypted user profile identifiers may be sent to a different delivery engine, called "DE2," that serves personalized advertisements to users. In particular, DE2 may provide advertisements relating to cars and travel. Accordingly, a trusted party may provide DE2 with a trapdoor based on a defined profile identifier relating to cars and a trapdoor based on a defined profile identifier related to travel. Using the trapdoors, DE2 may provide content rules associated with Mike's encrypted user profile identifiers associated with cars and travel. Further, DE2 may use delivery rules, such as match scoring rules, received from the trusted party to determine which content to associate with Mike's user profile identifiers related to cars and travel. For instance, the MSR provided may assess the user profile identifiers associated with cars and travel. For example, using the match scoring rules provided, a determination may be made that Mike has more user profile identifiers associated with cars than travel. Accordingly, a car advertisement may be provided to Mike from DE2.

The encrypted user profile identifiers may be matched with trapdoors based on a PEKS bilinear function to determine whether an encrypted user profile identifier matches a trapdoor. A function used to match the encrypted user profile identifiers ($X_{UPID}$) with the trapdoors ($TW_{PID}$) may be designated as follows:

$$e(X_{UPID}, TW_{PID})$$

Accordingly, privacy may be preserved for the user profile identifiers provided by the user. In embodiments, a delivery engine may not see content rules associated with an encrypted user profile identifier unless the delivery engine has access to an associated trapdoor. In alternative embodiments, a delivery engine may not see the content rules associated with an encrypted user profile identifier unless the delivery engine has access to a trapdoor based on a defined profile identifier that is the same or similar to a profile identifier associated with the user profile identifier. Further, the user profile identifier may be determined to be a "best match" among encrypted user profile identifiers matched with trapdoors.

If an advertisement associated with the user profile identifier is available, the advertisement may be presented to a user. If an advertisement associated with the user profile identifier is not available, an advertisement may not be provided to a user. Alternatively, if an advertisement associated with the user profile identifier is not available, another assessment of the encrypted user profile identifiers and trapdoors may be done to determine if another, secondary match is available. If a secondary match is available, the delivery engine may again be queried as to whether a matching advertisement is present as described above.

Privacy of user information may be further protected by introducing a finite life span into the delivery rules. In accordance with the "Mike" example above, an advertisement for a car may only be applicable from Jun. 1, 2009 to Jun. 30, 2009. As such, a request from Mike for a personalized advertisement received on Jun. 29, 2009 may be answered with a car advertisement. However, a request from Mike for a personalized advertisement on Jul. 1, 2009 may be answered with a travel advertisement if no car advertisements are available, and if a travel advertisement is available for that date.

As such, advertisements may possess characteristic expiration dates and/or time periods. In some embodiments, an expiration date and/or time period for a trapdoor may be introduced into a time stamp associated with the advertisement. Further, the defined profile identifiers may also comprise expiration dates and/or time periods. For example, Mike may designate his user profile identifier for travel to be his primary user profile identifier for advertisements during a period leading up to a particular date, such as Thanksgiving Day, when he plans to travel. However, Mike may set an expiration of that user profile identifier that coincides with the date itself, such that Mike may deprioritize his travel user profile identifier after the date has occurred. In some embodiments, an expiration date and/or time period for a trapdoor may be introduced into a time stamp associated with the request for personalized content.

Accordingly, in a first aspect, an embodiment of the present invention is directed to one or more computer-storage media having computer-executable instructions embodied thereon that, when executed, perform a method of delivering advertisements based on encrypted user profile identifiers. The method comprises receiving encrypted user profile identifiers from a first device. The encrypted user profile identifiers were encrypted using a public key from a second device. From a second device, advertisement delivery rules and one or more trapdoors that were generated based on the private key and one or more defined profile identifiers at the second device are received. Advertisement delivery rules are analogous to delivery rules described above and, as such, comprise match scoring rules and content rules. The advertisement delivery rules are associated with a portion of the encrypted user profile identifiers. Further, an encrypted user profile identifier is matched with a trapdoor. Content rules are then determined based on the matched trapdoor. Additionally, the user profile identifier is associated with an advertisement based on the content rules. Further, the advertisement is delivered to a user.

In a second aspect, an embodiment of the present invention is directed to one or more computer-storage media having computer-executable instructions embodied thereon that, when executed, perform a method of providing a user profile identifier to a delivery engine based on encrypted user profile identifiers. The method comprises receiving encrypted user profile identifiers from a first device. The encrypted user profile identifiers were encrypted using a public key from a second device. The method further comprises receiving advertisement delivery rules and one or more trapdoors from a second device. The one or more trapdoors were generated based on the private key at the second device. Additionally, the advertisement delivery rules are associated with a portion of the encrypted user profile identifiers. An encrypted user profile identifier is then matched with an associated trapdoor. Content rules are then determined based on the matched trapdoor. Further, the content rules are then provided to the delivery engine.

In a third aspect, an embodiment of the present invention is directed to one or more computer-storage media having computer-executable instructions embodied thereon that, when executed, perform a method of delivering content based on encrypted user profile identifiers. The method comprises receiving encrypted user profile identifiers from a first device. The encrypted user profile identifiers were encrypted using a public key from a second device. The method further comprises receiving one or more trapdoors from a delivery engine. The one or more trapdoors were generated based on the private key at the second device. Further, the advertisement delivery rules are associated with a portion of the encrypted user profile identifiers. An encrypted user profile identifier is then matched with a trapdoor. Content rules are then determined based on the matched trapdoor. The resulting content rules are then provided to the delivery engine. Further, at least one advertisement based on the content rules is received from the delivery engine.

Having described an overview of embodiments of the present invention, an exemplary operating environment suitable for implementing embodiments hereof is described below.

Referring to the drawings in general, and initially to FIG. 1 in particular, an exemplary computing device suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be practiced in a variety of system configurations, including handheld devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
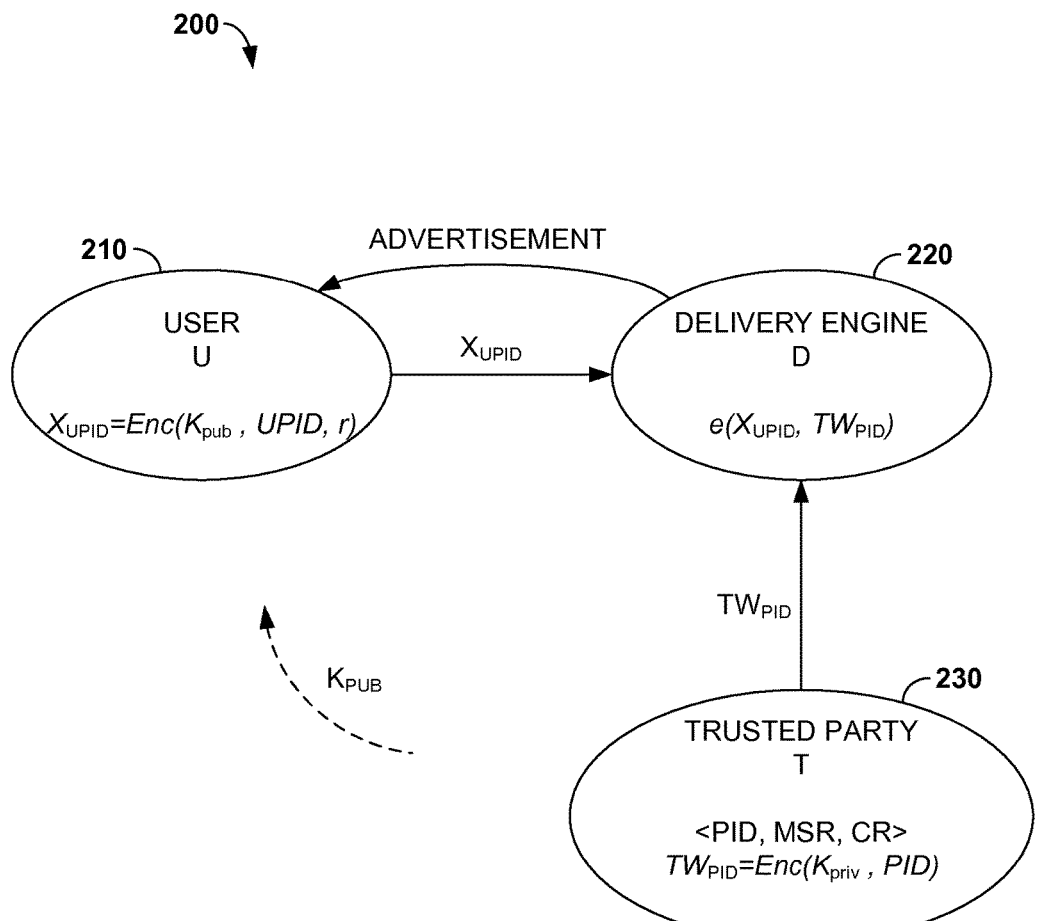
FIG. 2 illustrates an exemplary system for delivering advertisements based on encrypted user profile identifiers matched at a delivery engine in accordance with an embodiment of the present invention.
Figure 3:
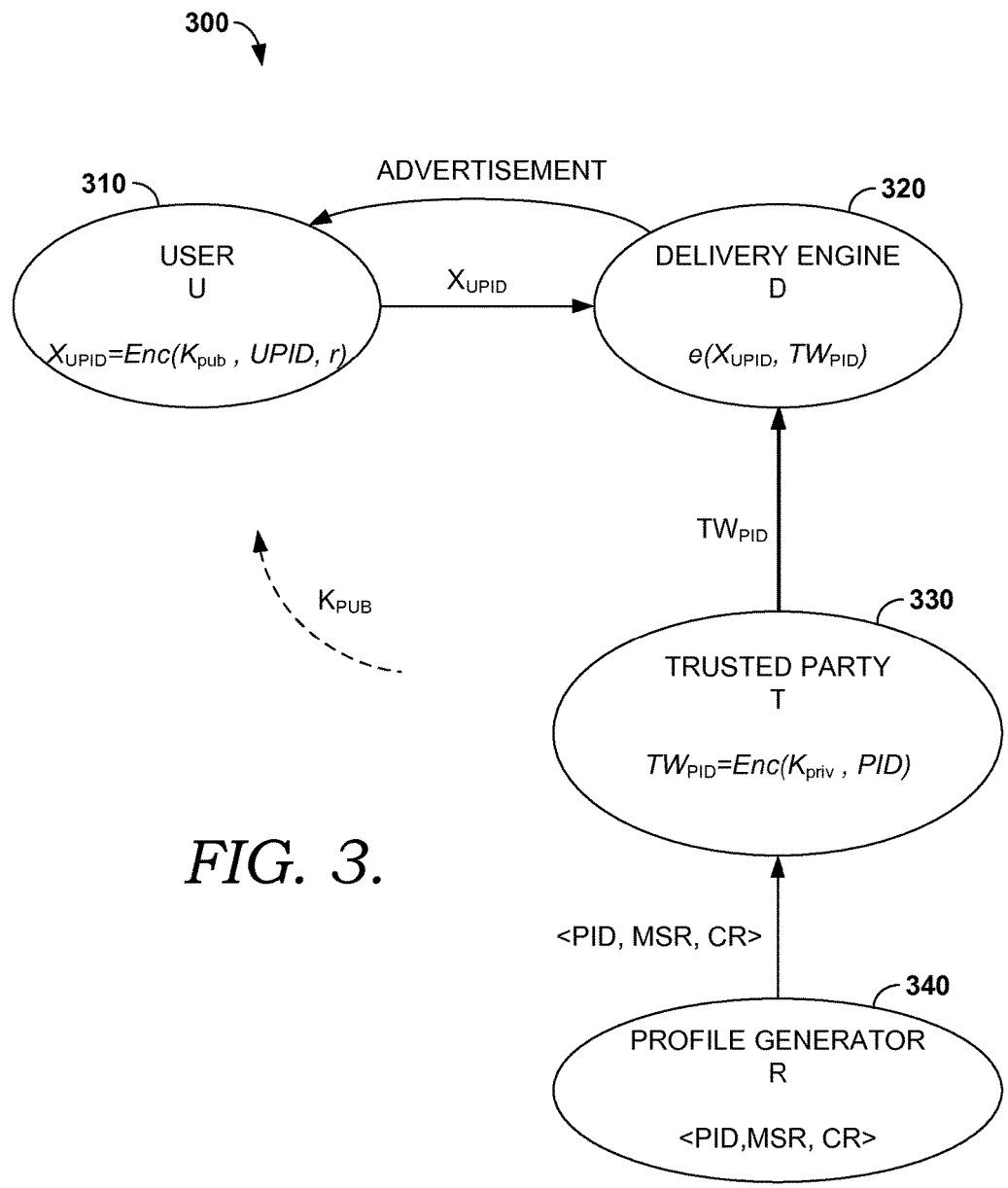
FIG. 3 illustrates another exemplary system for delivering advertisements based on encrypted user profile identifiers matched at a delivery engine in accordance with an embodiment of the present invention.
Figure 4:
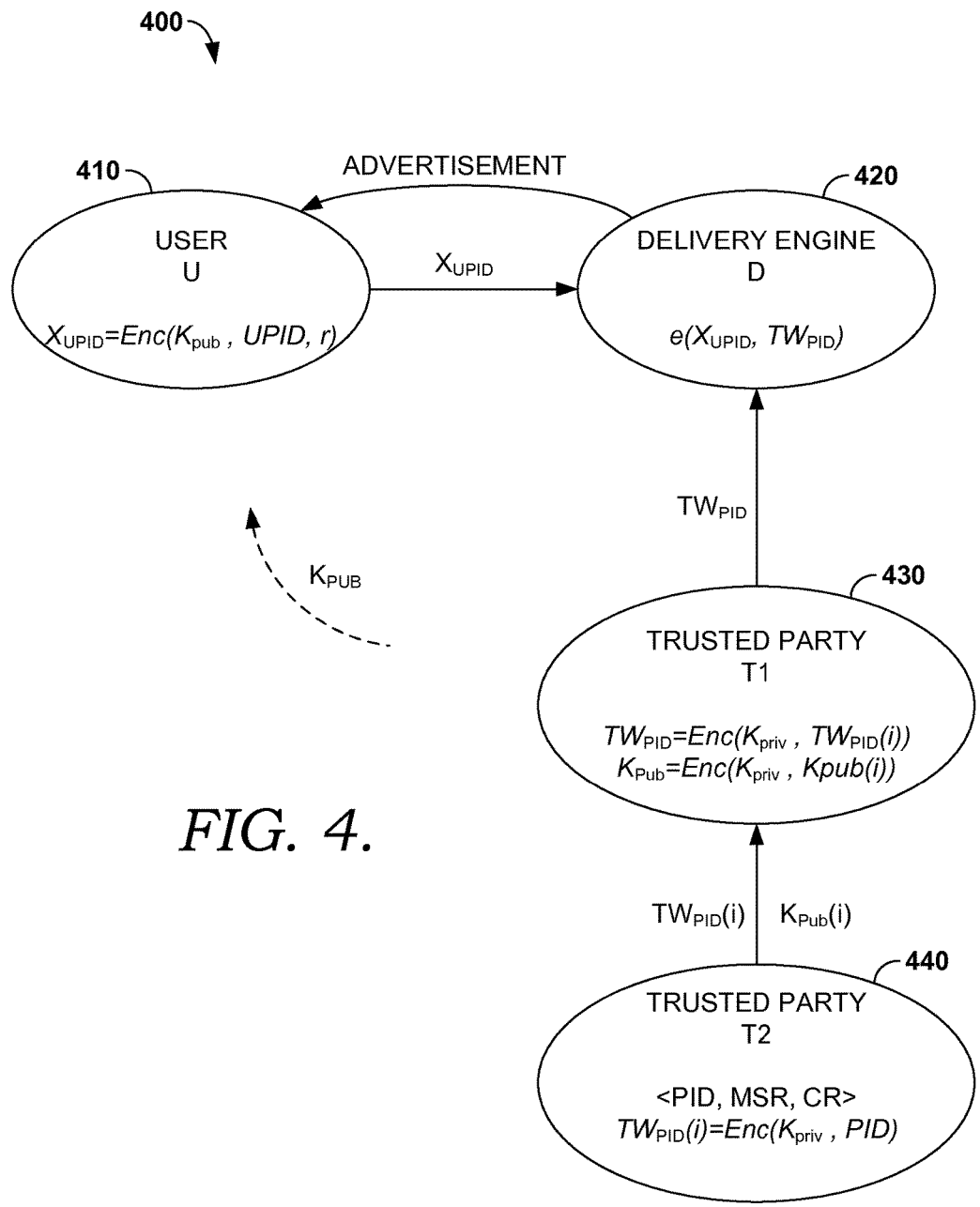
FIG. 4 illustrates a further exemplary system for delivering advertisements based on encrypted user profile identifiers matched at a delivery engine in accordance with an embodiment of the present invention.
Figure 5:
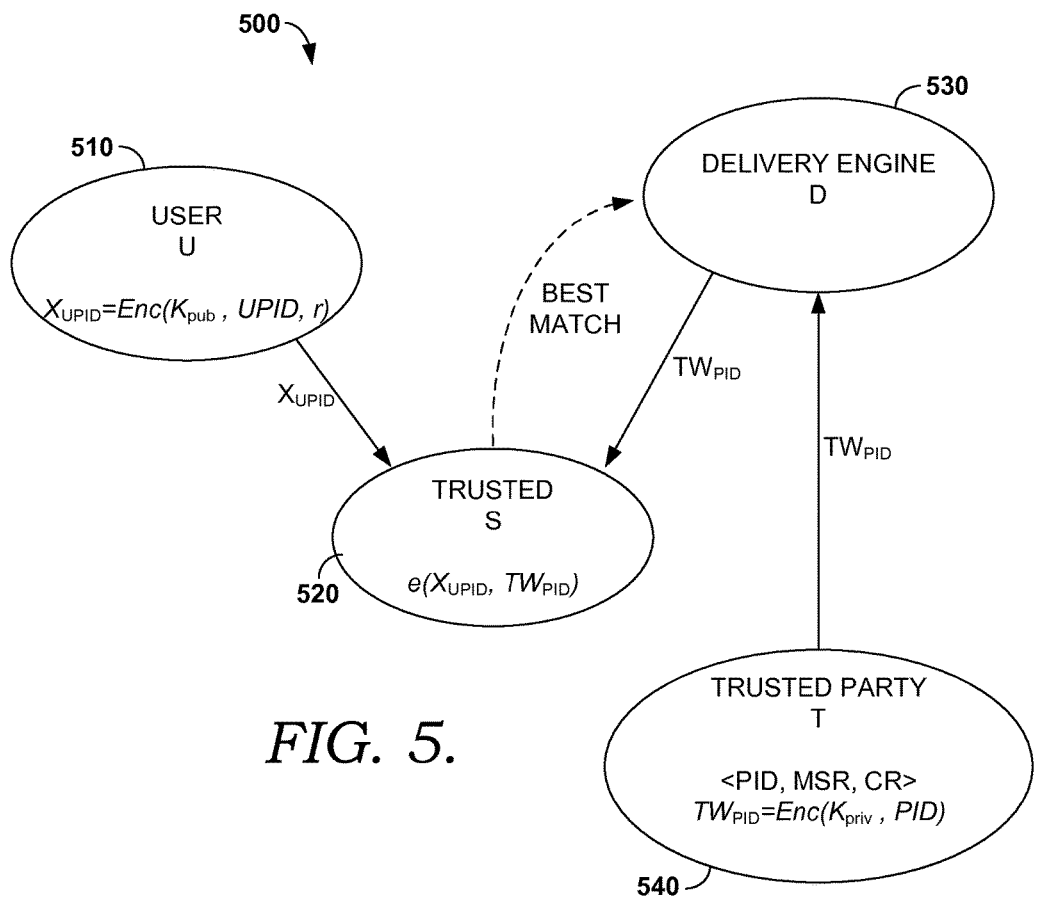
FIG. 5 illustrates an exemplary system for delivering advertisements based on encrypted user profile identifiers matched at a third party in accordance with an embodiment of the present invention.
Figure 6:
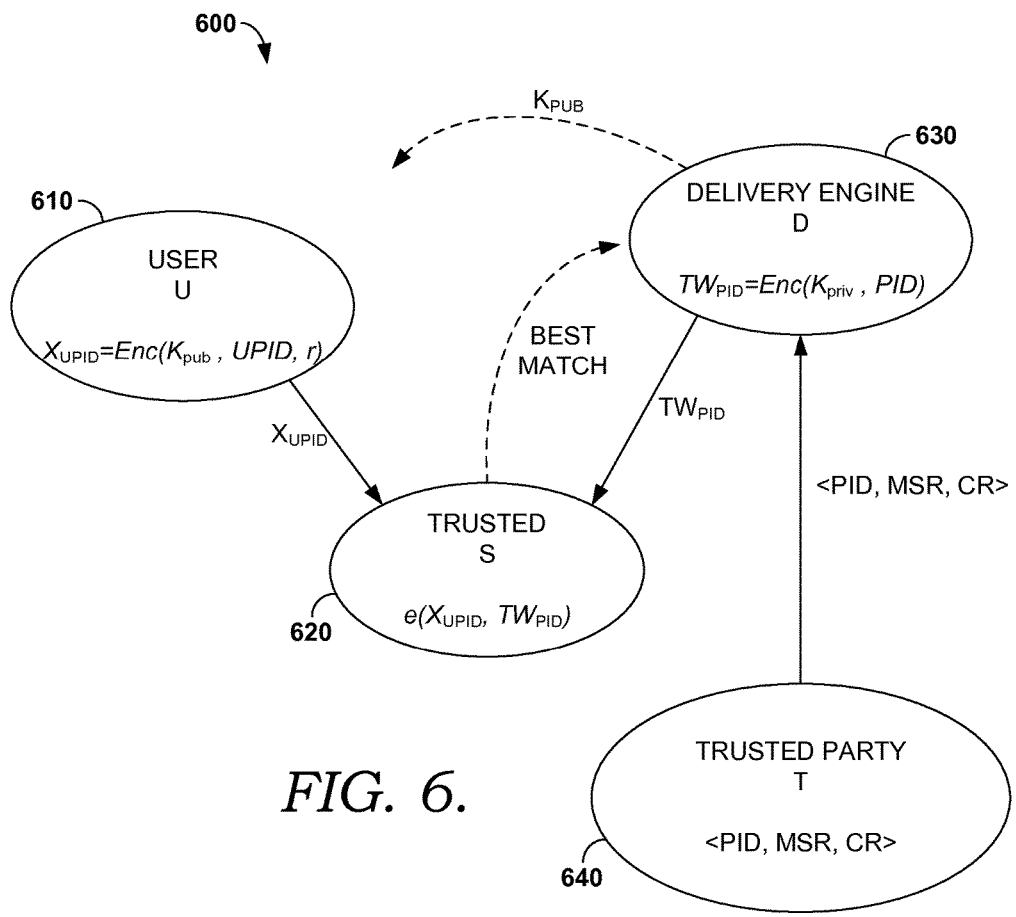
FIG. 6 illustrates another exemplary system for delivering advertisements based on encrypted user profile identifiers matched at a third party in accordance with an embodiment of the present invention.
Figure 7:
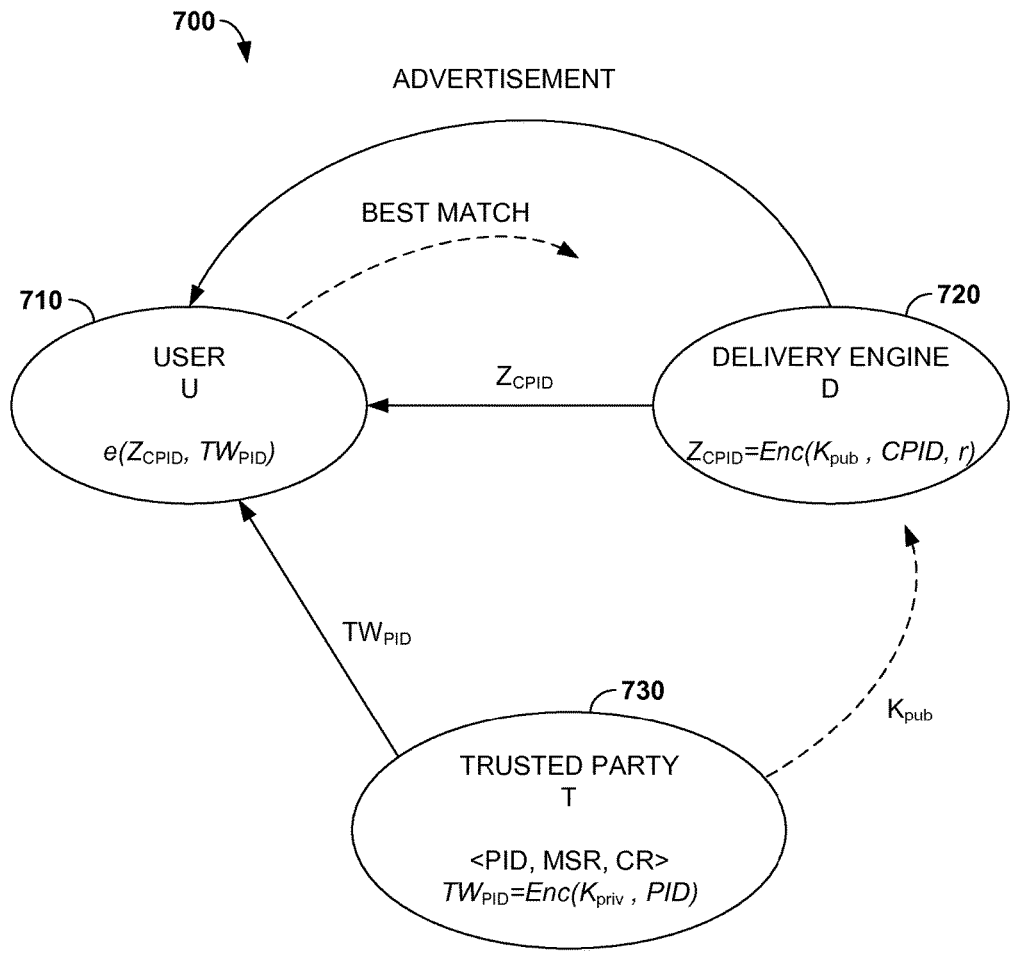
FIG. 7 illustrates an exemplary system for delivering advertisements based on encrypted user profile identifiers matched at a computing device associated with a user in accordance with an embodiment of the present invention.

In embodiments, the matching of encrypted user profile identifiers with available trapdoors based on defined profile identifiers is conducted at a delivery engine used to provide content to a user. FIGS. 2-4 discuss embodiments of systems where matching of the encrypted user profile identifiers with available trapdoors is conducted at the delivery engine. In further embodiments, the matching of encrypted user profile identifiers with available trapdoors is conducted at a third party that is independent of a delivery engine and a computing device associated with a user. FIGS. 5 and 6 discuss embodiments of systems where matching of the encrypted user profile identifiers with available trapdoors is conducted at the third party. Additionally, the matching of encrypted user profile identifiers with available trapdoors may be conducted at a computing device associated with a user. FIG. 7 discusses embodiments of systems where matching of the encrypted user profile identifiers with available trapdoors is conducted at the computing device associated with a user.

FIG. 2 illustrates an exemplary system 200 for delivering advertisements based on encrypted user profile identifiers matched at a delivery engine in accordance with an embodiment of the present invention. In particular, system 200 comprises a user component 210, a delivery engine 220, and a trusted party component 230 that are separate from each other and can be executed each on a separate computing device. In alternative embodiments, user component 210, delivery engine 220, and trusted party component 230 may be executed on one or more computing devices in separate applications. User component 210, generally designated as "U," may be associated with a user. Delivery engine 220, generally designated as "D," may deliver content, such as advertisements, to user component 210 based on content rules associated with a matched trapdoor. Trusted party component 230, generally designated as "T," may be associated with a trusted party. At trusted party component 230, a PEKS system may be used to generate a two-part encryption system comprising a public key component ("public key") and a private key component ("private key"). The public key is delivered from trusted party component 230 to user component 210. Accordingly, user profile identifiers (UPID) associated with a user may be encrypted ($X_{UPID}$) using the public key ($K_{PUB}$) at user component 210. In further embodiments, the encryption of user profile identifiers may be randomized with a random number designated as "r." Accordingly, the user profile identifiers (UPID) are encrypted using the function: $X_{UPID}=\text{Enc}(K_{PUB}, \text{UPID}, r)$.

In embodiments, defined profile identifiers (PID) are generated and/or received at trusted party component 230. Trusted party component 230 has delivery rules, such as advertisement delivery rules. In embodiments, advertisement delivery rules may be based on match scoring rules to determine one or more best matches between the encrypted user profile identifiers ($X_{UPID}$) and associated trapdoors ($TW_{PID}$). Match scoring rules, as used herein, refer to any category or association for determining and ranking a match between the encryption user profile identifiers ($X_{UPID}$) and the trapdoors ($TW_{PID}$). Advertisement delivery rules may also be based on content rules (CR) used to associate content, such as advertisements, with user profile identifiers that have matched trapdoors. content rules are used to provide a identification of content associated with user profile identifiers that are matched with associated trapdoors.

Trapdoors ($TW_{PID}$) may be generated at trusted party component 230 based on the private key ($K_{PRIV}$) and defined profile identifiers (PID). In particular, trapdoors may be generated based on the function: $TW_{PID}=\text{Enc}(K_{PRIV}, \text{PID})$. In alternative embodiments, trapdoors may be generated based on defined profile identifiers (PID) as well as the advertisement delivery rules, such as match scoring rules and/or content rules.

Trapdoors and advertisement delivery rules may be provided to delivery engine 220 from trusted party component 230. Further, encrypted user profile identifiers may be provided to delivery engine 220 from user component 210. At delivery engine 220, the encrypted user profile identifiers and the trapdoors may be compared to determine whether a match exists between the encrypted user profile identifiers and the trapdoors. A matching function may be performed using a PEKS bilinear function. A match between the encrypted user profile identifiers ($X_{UPID}$) and the trapdoors ($TW_{PID}$) may be determined using the function: $e(X_{UPID}, TW_{PID})$.

In embodiments, a best match is determined at delivery engine 220. For example, if more than one encrypted user profile identifier matches a portion of the trapdoors, a determination may be made as to which of the more than one matched encrypted user profile identifiers is a "best match." In embodiments, the determination of a best match may be determined by the advertisement delivery rules.

Once a matched encrypted user profile identifier has been determined, content rules that are associated with the matched trapdoor may be provided to the delivery engine. The content rules may then be used by the delivery engine 220 to determine content to present to the user associated with the user profile identifier. For example, content rules associated with a matched trapdoor may comprise a description that an advertisement featuring cars should be delivered to a user. Accordingly, a car advertisement may be sent to the user. In particular, the advertisement may be sent to user component 210 associated with the user. In further embodiments, the advertisement may be sent to an alternative computing device, such as a mobile device of the user.

FIG. 3 illustrates another exemplary system 300 for delivering advertisements based on encrypted user profile identifiers matched at a delivery engine in accordance with an embodiment of the present invention. System 300 of FIG. 3 comprises a user component 310, a delivery engine 320, a trusted party component 330, and a profiling generator 340 that are separate from each other and can be executed each on a separate computing device. In alternative embodiments, user component 310, delivery engine 320, trusted party component 330, and profiling generator 340 may be executed on one or more computing devices in separate applications. User component 310 may be designated "U."

Delivery engine 320, generally designated "D," may deliver content, such as advertisements, to user component 310 based on content rules associated with a matched trapdoor. Trusted party component 330 may be designated "T." At trusted party component 330, a PEKS system may be used to generate a two-part encryption system comprising a public key and a private key. The public key may be delivered from trusted party component 330 to user component 310. Accordingly, user profile identifiers (UPID) associated with a user may be encrypted ($X_{UPID}$) using the public key ($K_{PUB}$) at user component 310.

In embodiments, defined profile identifiers (PID) may be provided to trusted party component 330 from profiling generator 340. Profiling generator, designated as "R," may be associated with a profiling system. One or more trapdoors may be generated at trusted party component 330 based on the private key ($K_{PRIV}$) and defined profile identifiers (PID). Accordingly, trapdoors ($TW_{PID}$) may be generated based on the function: $TW_{PID}=Enc(K_{PRIV}, PID)$.

Profiling generator 340 may also provide trusted party component 330 with delivery rules, such as advertisement delivery rules. In embodiments, advertisement delivery rules may be based on match scoring rules to determine one or more best matches between the encrypted user profile identifiers ($X_{UPID}$) and associated trapdoors ($TW_{PID}$). Match scoring rules, as used herein, may refer to any category or association for determining and ranking a match between the encrypted user profile identifiers ($X_{UPID}$) and the trapdoors ($TW_{PID}$). In alternative embodiments, a matching function may be performed using a PEKS bilinear function.

Advertisement delivery rules may also be based on content rules (CR) used to associate content, such as advertisements, with profile identifiers that have matched trapdoors. content rules are used to provide a identification of content associated with defined profile identifiers (PID) that are matched with associated trapdoors ($TW_{PID}$).

Trapdoors ($TW_{PID}$) may be generated at trusted party component 330 based on the private key ($K_{PRIV}$) and defined profile identifiers (PID). In particular, trapdoors may be generated based on the function: $TW_{PID}=Enc(K_{PRIV}, PID)$. In alternative embodiments, trapdoors may be generated based on defined profile identifiers (PID) as well as the advertisement delivery rules, such as match scoring rules and/or content rules.

Trapdoors and advertisements delivery rules may be provided to the delivery engine 320 from trusted party component 330. In embodiments, trapdoors may comprise at least a portion of advertisement delivery rules. Further, encrypted user profile identifiers may be provided to the delivery engine 320 from user component 310. At delivery engine 320, the encrypted user profile identifiers and the trapdoors may be compared to determine whether a match exists between the encrypted user profile identifiers and the trapdoors. A matching function may be performed using a PEKS bilinear function. A match between the encrypted user profile identifiers and the trapdoors may be determined using the function: $e(X_{UPID}, TW_{PID})$.

In embodiments, a best match may be determined at delivery engine 320. For example, if more than one encrypted user profile identifier matches a portion of the trapdoors, a determination may be made as to which of the more than one matched encrypted user profile identifiers is a "best match." In embodiments, the determination of a best match may be determined by the advertisement delivery rules.

Once a matched encrypted user profile identifier has been determined, content rules that are associated with the matched trapdoor may be provided to the delivery engine. The content rules may then be used by the delivery engine 320 to determine content to present to the user associated with the user profile identifier. For example, content rules associated with a matched trapdoor may comprise a description that an advertisement featuring cars should be delivered to a user. Accordingly, a car advertisement may be sent to the user. In particular, the advertisement may be sent to user component 310 associated with the user. In further embodiments, the advertisement may be sent to an alternative computing device, such as a mobile device of the user.

FIG. 4 illustrates a further exemplary system 400 for delivering advertisements based on encrypted user profile identifiers matched at a delivery engine in accordance with an embodiment of the present invention. Similar to FIG. 3, system 400 of FIG. 4 comprises a user component 410, a delivery engine 420, a first trusted party component 430, and a second trusted party component 440 that are separate from each other and can be executed each on a separate computing device. In alternative embodiments, user component 410, delivery engine 420, first trusted party component 430, and second trusted party component 440 may be executed on one or more computing devices in separate applications. User component 410 may be designated "U." Delivery engine 420, generally designated "D," may deliver content, such as advertisements, to user component 410 based on content rules associated with a matched trapdoor. First trusted party component 430, generally designated "$T_1$," may be associated with a first trusted party. Further, second trusted party component 440, generally designated "$T_2$," may be associated with a second trusted party. At trusted party components 430 and 440, respectively, a PEKS system may be used to generate a two-part encryption key comprising a public key and a private key. In particular, at a first iteration performed at second trusted party component 440, the private key ($K_{PRIV}$) is generated. Further, a first portion of the public key, referred to as "$K_{PUB(i)}$," is generated at second trusted party component 440. Still at second trusted party component 440, the private key is used to partially generate trapdoors, referred to as "$TW_{PID(i)}$." The trapdoors may be generated based on the private key ($K_{PRIV}$) and defined profile identifiers (PID) at second trusted party component 440. The function used to generate $TW_{PID(i)}$ is: $TW_{PID(i)}=Enc(K_{PRIV}, PID)$.

At first trusted party component 430, a second iteration is performed. In particular, the remainder of the public key ($K_{PUB}$) is generated, where the public key is generated based on the private key ($K_{PRIV}$) and the first portion of the public key ($K_{PUB(i)}$). The function used to generate the public key is: $K_{PUB}=Enc(K_{PRIV}, K_{PUB(i)})$.

Further, at first trusted party component 430, the generation of trapdoors is completed. The completed trapdoors ($TW_{PID}$) are generated based on the private key ($K_{PRIV}$) and the partial trapdoors ($TW_{PID(i)}$) generated at second trusted party component 440. The function used to generate the trapdoors is: $TW_{PID}=Enc(K_{PRIV}, TW_{PID(i)})$. In alternative embodiments, trapdoors may be generated based on defined profile identifiers (PID) as well as the advertisement delivery rules, such as match scoring rules and/or content rules.

Second trusted party component 440 may also comprise delivery rules, such as advertisement delivery rules. In embodiments, advertisement delivery rules may be based on match scoring rules to determine one or more best matches between the encrypted user profile identifiers, designated as "$X_{UPID}$," and associated trapdoors ($TW_{PID}$). Match scoring rules, as used herein, refer to any category or association for determining and ranking a match between the encrypted user profile identifiers ($X_{UPID}$) and the trapdoors ($TW_{PID}$). Advertisement delivery rules may also be based on content rules used to associate content with user profile identifiers that have matched trapdoors. content rules may be used to provide a identification of content associated with user profile identifiers that are matched with associated trapdoors.

Trapdoors may be provided to the delivery engine 420 from first trusted party component 430. Further, encrypted user profile identifiers may be provided to the delivery engine 420 from user component 410. At delivery engine 420, the encrypted user profile identifiers and the trapdoors may be compared to determine whether a match exists between the encrypted user profile identifiers and the trapdoors. A matching function may be performed using a PEKS bilinear function. A match between the encrypted user profile identifiers ($X_{UPID}$) and the trapdoors ($TW_{PID}$) may be determined using the function: e ($X_{UPID}$, $TW_{PID}$).

In embodiments, a best match is determined at delivery engine 420. For example, if more than one encrypted user profile identifier matches a portion of the trapdoors, a determination may be made as to which of the more than one matched encrypted user profile identifiers is a "best match." In embodiments, the determination of a best match may be determined by the advertisement delivery rules.

Once a matched encrypted user profile identifier has been determined, content rules that are associated with the matched trapdoor may be provided to the delivery engine. The content rules may then be used by the delivery engine 420 to determine content to present to the user associated with the user profile identifier. For example, content rules associated with a matched trapdoor may comprise a description to deliver an advertisement featuring cars to a user. Accordingly, a car advertisement may be sent to the user. In particular, the advertisement may be sent to user component 410 associated with the user. In further embodiments, the advertisement may be sent to an alternative computing device, such as a mobile device of the user.

FIG. 5 illustrates an exemplary system 500 for delivering advertisements based on encrypted user profile identifiers matched at a third party in accordance with an embodiment of the present invention. In particular, system 500 comprises a user component 510, a third party 520, a delivery engine 530, and a trusted party component 540 that are separate from each other and can be executed each on a separate computing device. In alternative embodiments, user component 510, third party 520, delivery engine 530, and trusted party component 540 may be executed on one or more computing devices in separate applications. User component 510 may be designated "U." Delivery engine 530, generally designated "D," may deliver content, such as advertisements, to user component 510 based on content rules associated with a matched trapdoor determined at third party 520. Third party 520 may be designated as "S."

Trusted party component 540, generally designated as "T," may be associated with a trusted party. At trusted party component 540, a PEKS system may be used to generate two-part encryption system comprising a public key and a private key. The public key may be delivered from trusted party component 540 to user component 510. Alternatively, the public key may be provided to user component 510 from another party and/or computing device independent of system 500. Accordingly, user profile identifiers (UPID) associated with a user may be encrypted ($X_{UPID}$)) using the public key ($K_{PUB}$) at user component 510. In further embodiments, the encryption of user profile identifiers may be randomized with a random number designated as "r." Accordingly, the user profile identifiers may be encrypted using the function: $X_{UPID}$=Enc($K_{PUB}$, UPID, r).

In embodiments, defined profile identifiers (PID) are generated and/or received at trusted party component 540. Trusted party component 540 may also comprise delivery rules, such as advertisement delivery rules. In embodiments, advertisement delivery rules may be based on match scoring rules to determine one or more best matches between the encrypted user profile identifiers ($X_{UPID}$) and the trapdoors ($TW_{PID}$). Match scoring rules may refer to any category or association for determining and ranking a match between the encrypted user profile identifiers ($X_{UPID}$)) and the trapdoors ($TW_{PID}$). Advertisement delivery rules may also be based on content rules used to associate content with user profile identifiers that have matched trapdoors. content rules may be used to provide a identification of content, such as advertisements, associated with user profile identifiers that are matched with associated trapdoors. Further, trapdoors ($T_{PID}$) may be generated at trusted party component 540 based on the private key ($K_{PRIV}$) and defined profile identifiers (PID). In particular, trapdoors may be generated based on the function: $TW_{PID}$=Enc($K_{PRIV}$, PID). In alternative embodiments, trapdoors may be generated based on defined profile identifiers (PID) as well as the advertisement delivery rules, such as match scoring rules and/or content rules.

Trapdoors ($TW_{PID}$) may be provided from trusted party component 540 to third party 520 via delivery engine 530. At third party 520, the encrypted user profile identifiers and the trapdoors may be compared to determine whether a match exists between the encrypted user profile identifiers and the trapdoors. A matching function may be performed using a PEKS bilinear function. A match between the encrypted user profile identifiers ($X_{UPID}$) and the trapdoors ($TW_{PID}$) may be determined using the function: e ($X_{UPID}$, $TW_{PID}$).

In embodiments, a best match is determined at third party 520. For example, if more than one encrypted user profile identifiers match a portion of the trapdoors, a determination may be made as to which of the more than one matched encrypted user profile identifiers is a "best match." In embodiments, the determination of a best match may be determined by the advertisement delivery rules.

Once a matched encrypted user profile identifier has been determined, content rules that are associated with the matched trapdoor may then be provided to delivery engine 530. In embodiments, the content rules may be used by delivery engine 530 to determine content to present an advertisement to the user. For example, content rules associated with a matched trapdoor may comprise a description to delivery an advertisement featuring cars to the user. Accordingly, a car advertisement may be sent to the user. In particular, the advertisement may be sent to user component 510 associated with the user. In further embodiments, the advertisement may be sent to an alternative computing device, such as a mobile device of the user.

FIG. 6 illustrates another exemplary system 600 for delivering advertisements to a user based on encrypted user profile identifiers matched at a third party in accordance with an embodiment of the present invention. Similar to FIG. 5, system 600 of FIG. 6 comprises a user component 610, a third party 620, a delivery engine 630, and a trusted party component 640 that are separate from each other and can be executed each on a separate computing device. In alternative embodiments, user component 610, third party 620, delivery engine 630, and trusted party component 640 may be executed on one or more computing devices in separate applications. User component 610 may be designated "U."

Delivery engine 630, designated as "D," may deliver content, such as advertisements, to user component 610 based on content rules associated with a matched trapdoor determined at third party 620. Third party 620 may be designated as "S." Trusted party component 640, generally designated as "T," may be associated with a trusted party. At trusted party component 640, a PEKS system may be used to generate a two-part encryption system comprising a public key and a private key. The public key may be delivered from trusted party component 640 to user component 610. Accordingly, user profile identifiers (UPID) associated with a user may be encrypted ($X_{UPID}$) using the public key ($K_{PUB}$) at user component 610. In further embodiments, the encryption of the user profile identifiers may be randomized with a random number designated as "r." Accordingly, the user profile identifiers (UPID) may be encrypted using the function: $X_{UPID}=Enc(K_{PUB}, UPID, r)$.

In embodiments, defined profile identifiers are generated and/or received at trusted party component 640. Trusted party component 640 may also comprise delivery rules, such as advertisement delivery rules. In embodiments, advertisement delivery rules may be based on match scoring rules to determine one or more best matches between the encrypted user profile identifiers ($X_{UPID}$) and the trapdoors ($TW_{PID}$). Match scoring rules, as used herein, refer to any category or association for determining and ranking a match between the encrypted user profile identifiers ($X_{UPID}$) and the trapdoors ($TW_{PID}$). Advertisement delivery rules may also be based on content rules used to associate content, such as advertisements, with user profile identifiers that have matched trapdoors. content rules are used to provide a identification of content associated with user profile identifiers that are matched with associated trapdoors. Defined profile identifiers (PID), match scoring rules, and content rules may be provided from trusted party component 640 to delivery engine 630.

Trapdoors ($TW_{PID}$) may be generated at delivery engine 630 based on the private key ($K_{PRIV}$) and defined profile identifiers (PID). In particular, trapdoors may be generated based on the function: $TW_{PID}=Enc(K_{PRIV}, PID)$. In alternative embodiments, trapdoors may be generated based on defined profile identifiers (PID) as well as the advertisement delivery rules, such as match scoring rules and/or content rules.

The encrypted user profile identifiers may be provided to the third party 620. The trapdoors may also be provided to third party 620. At third party 620, the encrypted user profile identifiers and the trapdoors are compared to determine whether a match exists between the encrypted user profile identifiers and the trapdoors. A matching function may be performed using a PEKS bilinear function. A match between the encrypted user profile identifiers ($X_{UPID}$) and the trapdoors ($TW_{PID}$) may be determined using the function: e ($X_{UPID}$, $TW_{PID}$).

In embodiments, a best match is determined at third party 620. For example, if more than one encrypted user profile identifiers match a portion of the trapdoors, a determination may be made as to which of the more than one matched encrypted user profile identifiers is a "best match." In embodiments, the determination of a best match may be determined by the advertisement delivery rules.

Once a matched encrypted user profile identifier has been determined, content rules that are associated with the matched trapdoor may then be provided to delivery engine 630. In embodiments, the content rules may be used by delivery engine 630 to determine content to present an advertisement to the user. For example, content rules associated with a matched trapdoor may comprise a description to delivery an advertisement featuring cars to the user. Accordingly, a car advertisement may be sent to the user. In particular, the advertisement may be sent to user component 610 associated with the user. In further embodiments, the advertisement may be sent to an alternative computing device, such as a mobile device of the user.

FIGS. 2-6 discuss embodiments of the present invention where user profile identifiers are encrypted at a computing device associated with the user and then sent to a second device to be matched against trapdoors. However, it may be preferable for a user to limit exposure of his user profile identifiers by performing a matching function at the computing device associated with the user. Accordingly, a delivery engine may provide encrypted content profile identifiers to the computing device associated with the user. In embodiments, encrypted content profile identifiers comprise profile identifiers associated with content at a delivery engine. As such, the encrypted content profile identifiers from the delivery engine may be associated with content hosted at the delivery engine. Further, trapdoors may be provided to the computing device associated with the user from a second computing device. Based on the encrypted content profile identifiers and the trapdoors provided to the computing device associated with the user, a best match between the encrypted content profile identifiers and the trapdoors may be determined. The content profile identifier associated with the best match may then be provided to the delivery engine. In response to the matched content profile identifier, the delivery engine may provide an advertisement to the user.

FIG. 7 illustrates an exemplary system 700 for delivering advertisements based on encrypted content profile identifiers matched at a computing device associated with a user in accordance with an embodiment of the present invention. As such, system 700 comprises a user component 710, a delivery engine 720, and a trusted party component 730 that are separate from each other and can be executed each on a separate computing device. In alternative embodiments, user component 710, delivery engine 720, and trusted party 730 may be executed on one or more computing devices in separate applications. User component 710, generally designated as "U," may be associated with a user. Delivery engine 720, generally designated "D," may deliver content, such as advertisements, to user component 710 based on content rules associated with a matched trapdoor determined at user component 710. Trusted party component 730, generally designated as "T," may be associated with a trusted party. At trusted party component 730, a PEKS system may be used to generate a two-part encryption system comprising a public key and a private key. The public key may be delivered from trusted party component 730 to delivery engine 720. Accordingly, content profile identifiers associated with a delivery engine may be encrypted using the public key at delivery engine 720. Additionally, encrypted content profile identifiers from a delivery engine may be designated as "$Z_{CPID}$." In further embodiments, the encryption of the content profile identifiers ($Z_{CPID}$) may be randomized with a random number designated as "r." Accordingly, the content profile identifiers (CPID) may be encrypted using the function: $Z_{CPID}=Enc(K_{PUB}, CPID, r)$.

In embodiments, defined profile identifiers are generated and/or received at trusted party component 730. Trusted party component 730 may also comprise delivery rules, such as advertisement delivery rules. In embodiments, advertisement delivery rules may be based on match scoring rules to determine one or more best matches between the encrypted content profile identifiers ($Z_{CPID}$) and the trapdoors ($TW_{PID}$). Match scoring rules, as used herein, may refer to any category or association for determining and ranking a match between the encrypted content profile identifiers ($Z_{CPID}$) and the trapdoors ($TW_{PID}$). Advertisement delivery rules may also be based on content rules used to associate content, such as advertisement, with content profile identifiers that have matched trapdoors. content rules may be used to provide a identification of content associated with content profile identifiers that are matched with associated trapdoors.

Trapdoors ($TW_{PID}$) may be generated at user component 710 based on the private key ($K_{PRIV}$) and defined profile identifiers (PID). In particular, trapdoors may be generated based on the function: $TW_{PID}=Enc(K_{PRIV}, PID)$. In alternative embodiments, trapdoors may be generated based on defined profile identifiers (PID) as well as the advertisement delivery rules, such as match scoring rules and/or content rules.

At user component 710, the encrypted content profile identifiers and the trapdoors may be compared to determine whether a match exists between the encrypted content profile identifiers and the trapdoors. A matching function may be performed using a PEKS bilinear function. A match between the encrypted content profile identifiers ($Z_{CPID}$) and the trapdoors ($TW_{PID}$) may be determined using the function: $e(Z_{CPID}, TW_{PID})$.

In embodiments, a best match may be determined at user component 710. For example, if more than one encrypted content profile identifier matches a portion of the trapdoors, a determination may be made as to which of the more than one matched encrypted content profile identifiers is a "best match." In embodiments, the determination of a best match may be determined by the advertisement delivery rules.

Once a matched encrypted content profile identifier has been determined, content rules that are associated with the matched trapdoor may be provided to the delivery engine. The content rules may then be provided to delivery engine 730. In embodiments, the content profile identifier may be used by delivery engine 730 to determine content to present to the user associated with the content profile identifier. For example, content rules associated with the matched trapdoor may comprise a description to present an advertisement featuring cars to the user. Accordingly, a car advertisement may be sent to the user. In particular, the advertisement may be sent to user component 710 associated with the user. In further embodiments, the advertisement may be sent to an alternative computing device, such as a mobile device of the user.

Figure 8:
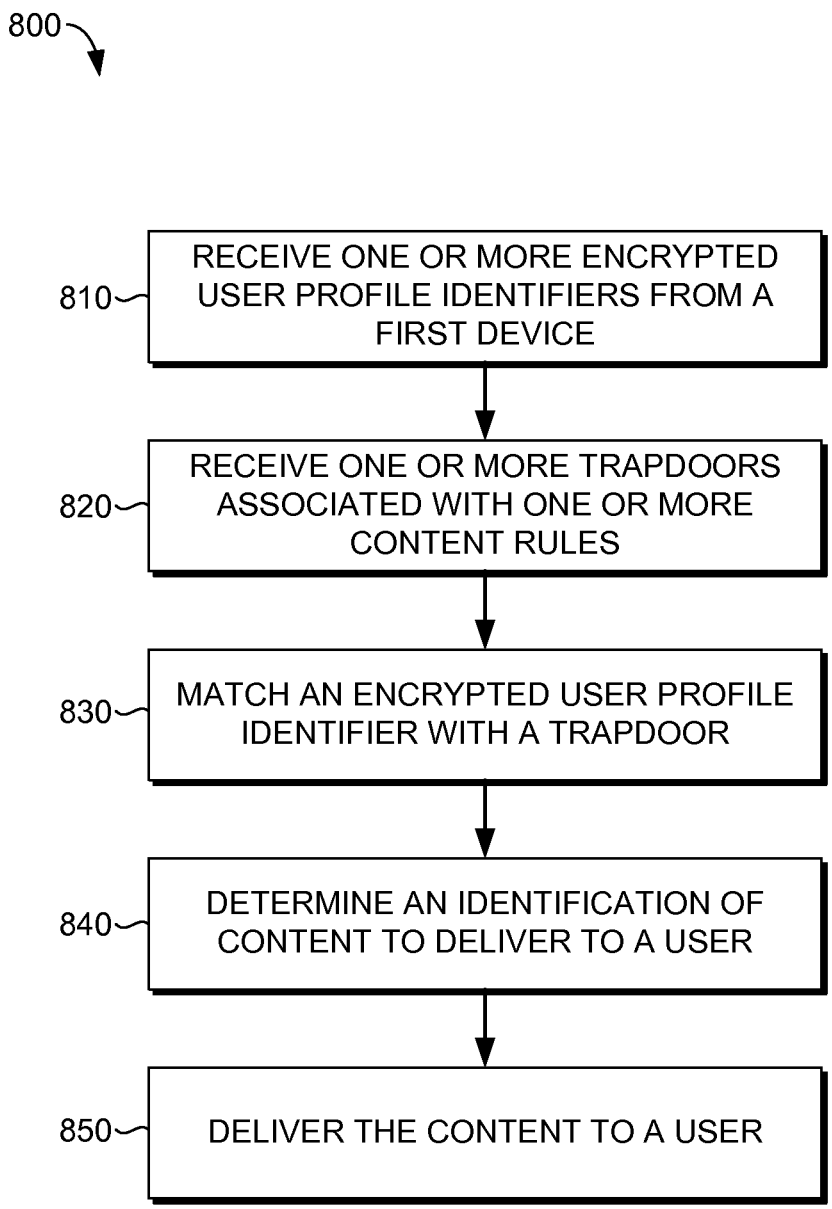
FIG. 8 is a flow diagram illustrating a method of delivering advertisements based on encrypted user profile identifiers in accordance with an embodiment of the present invention.

FIG. 8 is a flow diagram 800 illustrating a method of delivering content to a user based on encrypted user profile identifiers in accordance with an embodiment of the present invention. At step 810, one or more encrypted user profile identifiers are received from a first device. The user profile identifiers may be encrypted using a public key. The public key may be provided by a second device. At step 820, one or more trapdoors are received. One or more content rules may be associated with each of the one or more trapdoors. In embodiments, the content rules and/or one or more trapdoors are received from a second device. In alternative embodiments, the content rules may be included in the one or more trapdoors. Accordingly, the one or more trapdoors including the content rules may be generated by the second device. Further, the one or more trapdoors may be generated based on a private key and one or more defined profile identifiers. In particular, the trapdoors may comprise encrypted defined profile identifiers that were encrypted using a private key. In embodiments, the private key and the public key may be generated at the second device as part of a PEKS system. Additionally, the content rules may be associated with a second set of characteristics. At step 830, an encrypted user profile identifier is matched with a trapdoor. The matching of the encrypted user profile identifier and the trapdoor may be performed using a PEKS bilinear function. At step 840, an identification of content to deliver to a user is determined. The determination of the identification of content may be based on the matched trapdoor. At step 850, content is delivered to a user based on the identification of content. In embodiments, the content may be delivered to a computing device associated with the user. In further embodiments, the content may be an advertisement.

Figure 9:
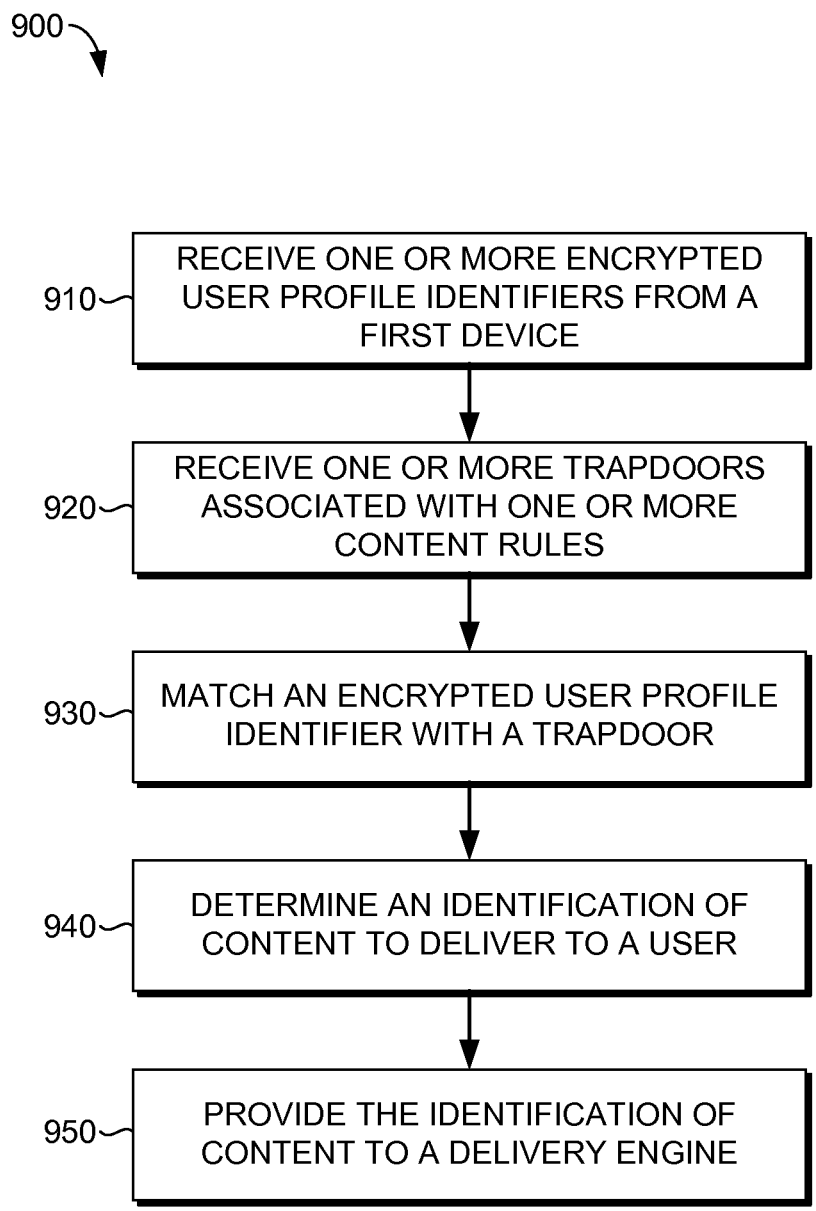
FIG. 9 is a flow diagram illustrating a method of providing a user profile identifier to a delivery engine based on encrypted user profile identifiers in accordance with an embodiment of the present invention.

FIG. 9 is a flow diagram 900 illustrating a method of providing an identification of content to a delivery engine based on encrypted user profile identifiers in accordance with an embodiment of the present invention. At step 910, one or more encrypted user profile identifiers are received from a first device. The user profile identifiers may be encrypted from a public key. The public key may be provided by a second device. At step 920, one or more trapdoors are received from a second device. In embodiments, one or more content rules are associated with each of the one or more trapdoors. In alternative embodiments, the one or more associated content rules may be included in the one or more trapdoors. Further, the one or more trapdoors may be generated at the second device. Additionally, the one or more trapdoors may be based on a private key. In particular, the trapdoors may comprise encrypted defined profile identifiers that were encrypted using a private key. In embodiments, the private key and the public key may be generated at the second device as part of a PEKS system. Additionally, the content rules may be associated with a second set of characteristics. At step 930, an encrypted user profile identifier is matched with a trapdoor. The matching of the encrypted user profile identifier and the trapdoor may be performed using a PEKS bilinear function. At step 940, an identification of content is determined based on the matched trapdoor. At step 950, the identification of content is provided to the delivery engine.

Figure 10:
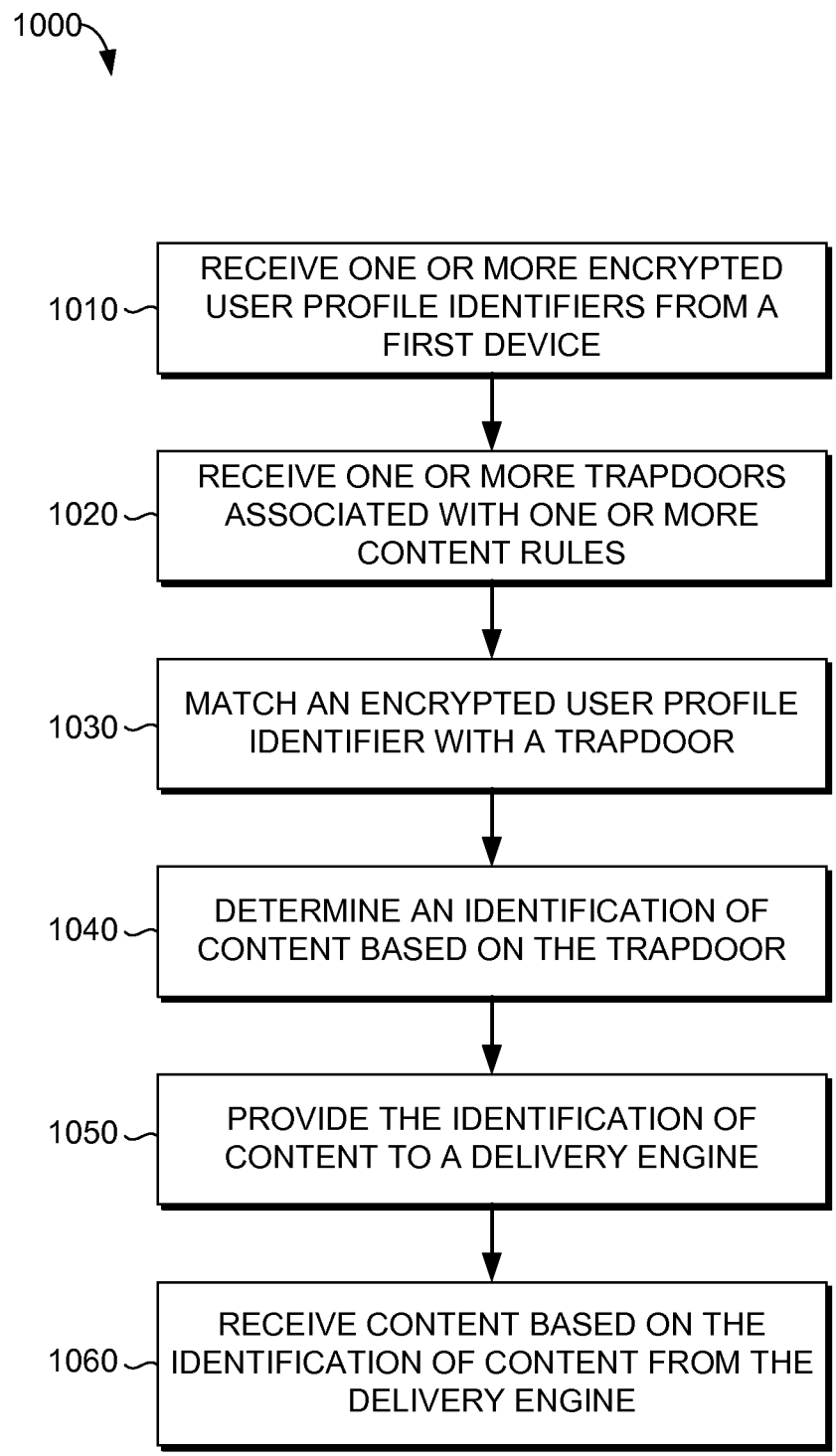
FIG. 10 is a flow diagram illustrating a method of delivering content based on encrypted user profile identifiers in accordance with an embodiment of the present invention.

FIG. 10 is a flow diagram 1000 illustrating a method of delivering content based on encrypted user profile identifiers in accordance with an embodiment of the present invention. At step 1010, one or more encrypted user profile identifiers are received from a first device. The user profile identifiers may be encrypted from a public key. The public key may be provided by a second device. At step 1020, one or more trapdoors are received from a second device. In embodiments, one or more content rules may be associated with each of the one or more trapdoors. In alternative embodiments, the content rules may be included in the one or more trapdoors. Accordingly, the one or more trapdoors including the content rules may be generated by the second device. Further, the one or more trapdoors may be based on a private key. In particular, the trapdoors may comprise encrypted defined profile identifiers that were encrypted using a private key. In embodiments, the private key and the public key may be generated at the second device as part of a PEKS system. Additionally, the content rules may be associated with a second set of characteristics. At step 1030, an encrypted user profile identifier is matched with a trapdoor. In embodiments, more than one encrypted user profile identifiers may be associated with trapdoors. Accordingly, matched user profile identifiers may be ranked according to the content rules. As such, a "best match" user profile identifier may be determined. At step 1040, content rules are determined based on the matched trapdoor. In embodiments, the user encrypted user profile identifier may comprise the "best match." At step 1050, the content rules are provided to the delivery engine. At step 1060, content based on the identification of content is received from the delivery engine. In embodiments, the content may be an advertisement.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for delivering content to a user based on encrypted user profile identifiers, the system comprising:
one or more processors;
one or more computer storage media storing computer-executable instructions that, when executed by the one or more processors, cause the one or more processors to:
receive, from a first device, one or more encrypted user profile identifiers comprising user profile identifiers that were encrypted by the first device using a public key provided to the first device by a second device, wherein the first device is different from the second device, and wherein the user profile identifiers comprise terms corresponding to one or more of user preferences or user activities that are associated with the user;
receive, from the second device, one or more trapdoors comprising encrypted defined profile identifiers, the encrypted defined profile identifiers comprising defined profile identifiers that were encrypted by the second device using a private key, wherein the defined profile identifiers comprise generic content topics, and wherein one or more content rules are associated with each of the one or more trapdoors and the one or more content rules include a description of content to provide to the user;
match the one or more encrypted user profile identifiers with at least one of the one or more trapdoors;
determine an identification of content to deliver to the user based on the associated one or more content rules and the matching of the one or more encrypted user profile identifiers with the at least one of the one or more trapdoors; and
deliver content to the user based on the identification of content.

2. The system of claim 1, wherein the content is an advertisement.

3. The system of claim 1, wherein the private key comprises a private key first component and a private key second component.

4. The system of claim 3, wherein a first portion of the one or more trapdoors are generated in a first iteration using the private key first component and wherein a second portion of the one or more trapdoors are generated in a second iteration using the private key second component.

5. The system of claim 1, wherein the defined profile identifiers are associated with a delivery engine.

6. The system of claim 1, wherein the identification of content comprises at least one of content or a link to content.

7. A computer-implemented method of providing an identification of content to a delivery engine based on encrypted user profile identifiers, the method comprising:
receiving from a first device one or more encrypted user profile identifiers that were encrypted using a public key from a second device;
receiving from a delivery engine one or more trapdoors, the one or more trapdoors comprising encrypted defined profile identifiers, the encrypted defined profile identifiers comprising defined profile identifiers that were encrypted using a private key, wherein one or more content rules are associated with each of the one or more trapdoors and the one or more content rules include a description of content to provide to a user and the defined profile identifiers comprise an expiration period;
at a processor of a computing device, matching the one or more encrypted user profile identifiers with at least one of the one or more trapdoors;
determining the identification of content based on the associated one or more content rules and the matching of the one or more encrypted user profile identifiers with the at least one of the one or more trapdoors; and
providing the identification of content to the delivery engine.

8. The method of claim 7, wherein the private key comprises a private key first component and a private key second component.

9. The method of claim 8, wherein a first portion of the one or more trapdoors is generated in a first iteration based on the private key first component and wherein a second portion of the one or more trapdoors is generated in a second iteration based on the private key second component and one or more defined profile identifiers.

10. The method of claim 9, wherein the one or more trapdoors are generated based on the private key and one or more defined profile identifiers at the second device.

11. The method of claim 10, wherein the content is an advertisement.

12. The method of claim 7, wherein the identification of content comprises at least one of content or a link to content.

13. Computer-storage media having computer-executable instructions embodied thereon that, when executed, perform a method of delivering content based on encrypted user profile identifiers, the method comprising:
receiving from a first device one or more encrypted user profile identifiers that were encrypted using a public key from a second device;
receiving, from a delivery engine, one or more trapdoors comprising encrypted defined profile identifiers that were encrypted using a private key, wherein one or more content rules are associated with each of the one or more trapdoors and the one or more content rules include a description of content to provide to a user;
matching the one or more encrypted user profile identifiers with at least one of the one or more trapdoors, wherein the matching comprises determining at least one of the one or more encrypted user profile identifiers to be a best match with the at least one of the one or more trapdoors;

determining an identification of content based on the associated one or more content rules and the matching of the one or more encrypted user profile identifiers with the at least one of the one or more trapdoors;

providing the identification of content to the delivery engine; and receiving content based on the identification of content from the delivery engine.

14. The computer-storage media of claim 13, wherein the content is an advertisement.

15. The computer-storage media of claim 13, wherein the identification of content comprises at least one of content or a link to content.

16. The computer-storage media of claim 13, wherein the private key comprises a private key first component and a private key second component.

17. The computer-storage media of claim 16, wherein a first portion of the one or more trapdoors is generated in a first iteration based on the private key first component, and wherein a second portion of the one or more trapdoors is generated in a second iteration based on the private key second component.

18. The computer-storage media of claim 13, wherein the public key used to encrypt the user profile identifiers is randomized.

19. The computer-storage media of claim 13, wherein a bilinear function is used to match the one or more encrypted user profile identifiers with the at least one of the one or more trapdoors.

20. The system of claim 1, wherein the one or more trapdoors received from the second device are received at a delivery engine, and wherein the delivery engine receives only trapdoors associated with defined profile identifiers that are related to content available at the delivery engine.

* * * * *